(12) United States Patent
Haba et al.

(10) Patent No.: US 10,944,126 B2
(45) Date of Patent: Mar. 9, 2021

(54) POSITIVE ELECTRODE FOR LITHIUM ION SECONDARY BATTERY, AND LITHIUM ION SECONDARY BATTERY USING THE SAME

(71) Applicant: HITACHI CHEMICAL COMPANY, LTD., Tokyo (JP)

(72) Inventors: Eisuke Haba, Tokyo (JP); Masashi Aotani, Tokyo (JP); Hiroki Kuzuoka, Tokyo (JP)

(73) Assignee: Showa Denko Materials Co., Ltd., Tokyo (JP)

(*) Notice: Subject to any disclaimer, the term of this patent is extended or adjusted under 35 U.S.C. 154(b) by 580 days.

(21) Appl. No.: 15/533,915

(22) PCT Filed: Nov. 30, 2015

(86) PCT No.: PCT/JP2015/083576
§ 371 (c)(1),
(2) Date: Jun. 7, 2017

(87) PCT Pub. No.: WO2016/093095
PCT Pub. Date: Jun. 16, 2016

(65) Prior Publication Data
US 2017/0331146 A1   Nov. 16, 2017

(30) Foreign Application Priority Data
Dec. 8, 2014  (JP) ................................. 2014-247699

(51) Int. Cl.
*H01M 10/0525* (2010.01)
*H01M 4/131* (2010.01)
(Continued)

(52) U.S. Cl.
CPC ......... *H01M 10/0525* (2013.01); *C08F 14/22* (2013.01); *C08F 283/06* (2013.01);
(Continued)

(58) Field of Classification Search
CPC ......... C09D 127/16; C08K 3/01; C08F 14/22; C08F 283/06; H01M 10/0525;
(Continued)

(56) References Cited

U.S. PATENT DOCUMENTS

2011/0171563 A1* 7/2011 Waki ................... H01M 8/0239
429/514
2012/0058378 A1* 3/2012 Lee ......................... B32B 27/08
429/127
(Continued)

FOREIGN PATENT DOCUMENTS

CN    101023543 A    8/2007
CN    103597637 A    2/2014
(Continued)

OTHER PUBLICATIONS

International Search Report for PCT/JP2015/083576 dated Feb. 23, 2016; English translation submitted herewith (5 pages).

*Primary Examiner* — Lingwen R Zeng
(74) *Attorney, Agent, or Firm* — Fitch, Even, Tabin & Flannery, LLP

(57) ABSTRACT

A positive electrode for a lithium ion secondary battery, including a positive electrode current collector, a conductive layer which is disposed directly or indirectly on the positive electrode current collector, and which includes a conductive particle, a polymer particle, and a fluororesin or a resin including a structural unit derived from a nitrile group-containing monomer, and a positive electrode active material layer disposed directly or indirectly on the conductive layer, as well as a lithium ion secondary battery using the same.

15 Claims, 1 Drawing Sheet

(51) Int. Cl.
*C08F 283/06* (2006.01)
*H01M 4/62* (2006.01)
*C08F 14/22* (2006.01)
*H01M 4/13* (2010.01)
*H01M 4/66* (2006.01)
*C09D 127/16* (2006.01)
*H01M 4/02* (2006.01)

(52) U.S. Cl.
CPC ............ *C09D 127/16* (2013.01); *H01M 4/13* (2013.01); *H01M 4/131* (2013.01); *H01M 4/623* (2013.01); *H01M 4/663* (2013.01); *H01M 4/667* (2013.01); *H01M 4/668* (2013.01); *H01M 2004/021* (2013.01); *H01M 2004/028* (2013.01)

(58) Field of Classification Search
CPC ..... H01M 2004/021; H01M 2004/028; H01M 4/13; H01M 4/131; H01M 4/623; H01M 4/663; H01M 4/667; H01M 4/668; Y02E 60/10
See application file for complete search history.

(56) References Cited

U.S. PATENT DOCUMENTS

| | | | |
|---|---|---|---|
| 2014/0127571 A1 | 5/2014 | Moroishi et al. | |
| 2015/0221452 A1* | 8/2015 | Iida | H01M 4/622 |
| | | | 429/217 |
| 2015/0280241 A1 | 10/2015 | Hara et al. | |

FOREIGN PATENT DOCUMENTS

| | | |
|---|---|---|
| JP | H10-050294 A | 2/1998 |
| JP | 2001-357854 A | 12/2001 |
| JP | 2002-526897 A | 8/2002 |
| JP | 2009-176599 A | 8/2009 |
| JP | 2012-104422 A | 5/2012 |
| JP | 2013-211161 A | 10/2013 |
| WO | 1999/067835 A1 | 12/1999 |
| WO | 2011/002057 A1 | 1/2011 |
| WO | 2012/173072 A1 | 2/2015 |
| WO | 2014/050653 A1 | 8/2016 |

* cited by examiner

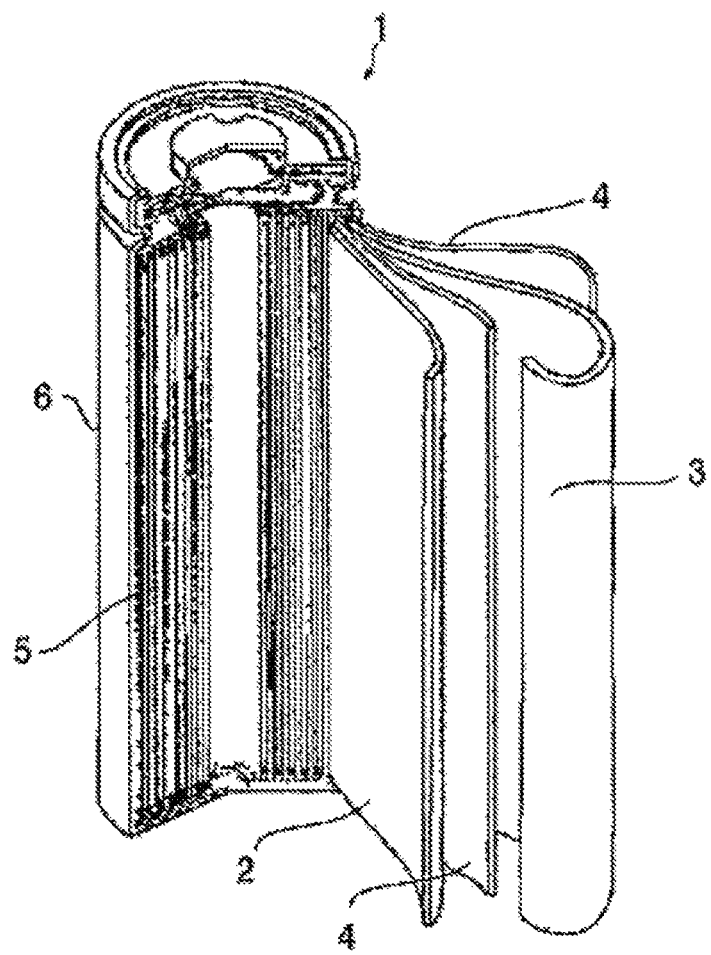

POSITIVE ELECTRODE FOR LITHIUM ION SECONDARY BATTERY, AND LITHIUM ION SECONDARY BATTERY USING THE SAME

CROSS-REFERENCE TO RELATED APPLICATIONS

This application is a U.S. national phase application filed under 35 U.S.C. § 371 of International Application No. PCT/JP2015/083576, filed Nov. 30, 2015, designating the United States, which claims priority from Japanese Patent Application No. 2014-247699, filed Dec. 8, 2014, which are hereby incorporated herein by reference in their entirety.

TECHNICAL FIELD

The present invention relates to a positive electrode for a lithium ion secondary battery, and a lithium ion secondary battery using the same.

BACKGROUND ART

Lithium ion secondary batteries which are energy devices having a high energy density are generally used as power supplies for mobile information terminals such as laptops, mobile phones, and PDAs (Personal Digital Assistants). There is used, as a representative lithium ion secondary battery, a wound electrode group obtained by stacking a positive electrode, a separator, a negative electrode, and a separator in this order, and winding up the resultant, or a laminated electrode group obtained by layering a positive electrode, a separator, and a negative electrode. Negative electrode active materials mainly used are carbon materials having multi-layered structures which enable lithium ions to be inserted into and ejected from spaces between layers (formation of lithium intercalation compounds). Positive electrode active materials mainly used are lithium-containing composite metal oxides. Separators mainly used are polyolefin porous membranes. Such lithium ion secondary batteries are high in battery capacities and output power, and are also favorable in charging/discharging cycle characteristic.

Lithium ion secondary batteries, while being at a high level in terms of safety, are demanded to be further enhanced in terms of safety because of having high capacities and high output power. For example, lithium ion secondary batteries can generate heat when overcharged. Lithium ion secondary batteries can also generate heat due to the occurrence of internal short-circuits thereof. Lithium ion secondary batteries include non-aqueous electrolytes containing organic solvents, and therefore heat generation therein can chemically decompose the organic solvents, thereby generating gas and causing any failure such as an increase in internal pressure of lithium ion secondary batteries.

It is currently aimed to further enhance safety of lithium ion secondary batteries by blocking current in lithium ion secondary batteries to suppress of heat generation in overcharging of lithium ion secondary batteries. Examples of a solution for a further enhancement in safety of lithium ion secondary batteries include (1) a method in which a mechanism is utilized which detects the internal pressure of lithium ion secondary batteries and blocks current, such as a safety valve disposed in a sealing plate, (2) a method in which a member including a PTC (Positive temperature coefficient) element whose electrical resistance is increased due to heat generation in lithium ion secondary batteries is disposed in a sealing plate and the PTC element serves as a non-conductor, thereby blocking current, and (3) a method in which a separator which is molten due to heat generation in lithium ion secondary batteries is used, and the separator is molten, thereby inhibiting lithium ions from moving between positive and negative electrodes to block current.

Japanese National-Phase Publication (JP-A) No. 2002-526897, Japanese Patent Application Laid-Open (JP-A) No. H10-50294, and Japanese Patent Application Laid-Open (JP-A) No. 2009-176599 have proposed an electrode where a PTC layer is formed, as another solution for blocking current and suppressing heat generation in a lithium ion secondary battery. The PTC layer refers to a layer having a function of increasing electrical resistance (direct-current resistance) due to heat generation in a battery, as in the PTC element. The electrode (at least one of a positive electrode and a negative electrode) described in JP-A No. 2002-526897, JP-A No. H10-50294, and JP-A No. 2009-176599 is a laminated body obtained by stacking a positive electrode active material layer or a negative electrode active material layer, the PTC layer, and a current collector in this order. The PTC layer in JP-A No. 2002-526897 is formed by heating and mixing a conductive particle (carbon particle) and a binder resin (mixed polymer of low-density polyethylene and ethylene vinyl acetate), molding the resulting mixture into a sheet, heat-treating the resulting sheet, and thereafter layering the sheet on the current collector.

The PTC layer in JP-A No. H10-50294 is formed by mixing a conductive microbead (conductive particle) and a matrix resin (polyvinylidene fluoride powder) in an organic solvent to prepare a paste, coating a positive electrode current collector surface and a negative electrode current collector surface with the paste, and drying the resultant. In such a PTC layer, the conductive particle is mutually contacted, thereby forming a conductive network. In the conductive network, as the lithium ion secondary battery is overheated, the matrix resin is expanded, thereby resulting in the non-contact state of the conductive particle to block current.

The PTC layer in JP-A No. 2009-176599 is formed by dispersing a conductive particle (carbon particle) and a polymer particle (polyethylene particle) in water to prepare a paste, coating a positive electrode current collector surface with the paste, and drying the resultant.

SUMMARY OF INVENTION

Technical Problem

The method (1), however, may cause an insufficient suppression effect of heat generation because progression of an electrolytic solution decomposition reaction causing the change in internal pressure of the lithium ion secondary battery depends on not only the battery temperature, but also the battery voltage, the environment temperature, and the like, and therefore response to heat generation in the lithium ion secondary battery is inaccurate. The method (2) may cause an insufficient suppression effect of heat generation because an electrode group serving as a main heat generator in the lithium ion secondary battery, and the PTC element in the sealing plate are in a distant positional relationship, thereby resulting in deterioration in responsiveness to heat generation in the PTC element. The method (3) may cause an insufficient increase in output power of the lithium ion secondary battery and an insufficient enhancement in charging/discharging cycle characteristic because a separator which is molten by favorable responsiveness to heat generation in the lithium ion secondary battery is required to be used and such a separator is used.

It is contemplated that the configuration described in JP-A No. 2002-526897, where the PTC layer formed in the form of a sheet in advance is layered on the current collector, causes an increase in the initial internal resistance of the resulting lithium ion secondary battery. In a case in which the lithium ion secondary battery has a high initial internal resistance, the lithium ion secondary battery cannot provide an increased output power (excellent discharge rate characteristic) in some cases.

In the electrode described in JP-A No. H10-50294, the conductive network partially remains with being not broken, even a case in which the matrix resin is expanded. Accordingly, the electrode described in JP-A No. H10-50294 does not have a sufficient accuracy of current blocking, and has the possibility that current cannot be blocked in overcharging.

The PTC layer described in JP-A No. 2009-176599 is aimed to block current due to the non-contact state of the conductive particle by melting a resin particle according to overheating. It, however, has been found by studies of the inventors that a positive electrode including the PTC layer described in JP-A No. 2009-176599 is increased in the initial internal resistance of the lithium ion secondary battery and has difficulty in an increase in the output power of the lithium ion secondary battery. The reason for an increase in the initial internal resistance of the lithium ion secondary battery is contemplated because the conductive particle is insufficiently dispersed and the conductive network is not uniformly put throughout the PTC layer.

The invention has been made in view of the above problems, and an object thereof is to provide a positive electrode for a lithium ion secondary battery, which has a function of increasing the internal resistance (hereinafter, also referred to as "direct-current resistance") of a lithium ion secondary battery in temperature rise and which has an excellent discharge rate characteristic during normal operating thereof, as well as a lithium ion secondary battery using the same.

Solution to Problem

Specific solutions for achieving the above object are as follows.

<1> A positive electrode for a lithium ion secondary battery, the positive electrode comprising:
a positive electrode current collector;
a conductive layer which is disposed directly or indirectly on the positive electrode current collector, and which comprises a conductive particle, a polymer particle, and a fluororesin or a resin comprising a structural unit derived from a nitrile group-containing monomer; and
a positive electrode active material layer disposed directly or indirectly on the conductive layer.

<2> The positive electrode for a lithium ion secondary battery according to <1>, wherein a thickness of the conductive layer is from 1 μm to 10 μm.

<3> The positive electrode for a lithium ion secondary battery according to <1> or <2>, wherein a mass ratio of a total of the conductive particle and the polymer particle with respect to the fluororesin or the resin comprising a structural unit derived from a nitrile group-containing monomer (total of the conductive particle and the polymer particle: the resin) included in the conductive layer is from 99.9:0.1 to 95:5.

<4> The positive electrode for a lithium ion secondary battery according to any one of <1> to <3>, wherein an average particle size of the polymer particle is from 0.05 μm to 5 μm.

<5> The positive electrode for a lithium ion secondary battery according to any one of <1> to <4>, wherein the conductive particle is a carbon particle.

<6> The positive electrode for a lithium ion secondary battery according to <5>, wherein an average particle size of a primary particle of the carbon particle is from 10 nm to 500 nm.

<7> The positive electrode for a lithium ion secondary battery according to any one of <1> to <6>, wherein the polymer particle is a polyolefin particle.

<8> The positive electrode for a lithium ion secondary battery according to any one of <1> to <7>, wherein a mass ratio of the conductive particle with respect to the polymer particle (conductive particle:polymer particle) is from 2:98 to 20:80.

<9> The positive electrode for a lithium ion secondary battery according to any one of <1> to <8>, wherein the resin comprising a structural unit derived from a nitrile group-containing monomer comprises at least one selected from the group consisting of a structural unit derived from a monomer represented by the following Formula (I) and a structural unit derived from a monomer represented by the following Formula (II):

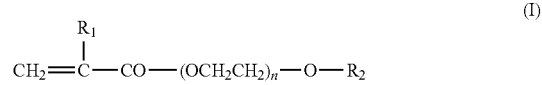

$$CH_2=\overset{R_1}{\underset{|}{C}}-CO-(OCH_2CH_2)_n-O-R_2 \qquad (I)$$

wherein $R_1$ represents H or $CH_3$, $R_2$ represents H or a monovalent hydrocarbon group, and n represents an integer from 1 to 50; and

$$CH_2=\overset{R_3}{\underset{|}{C}}-COO-R_4 \qquad (II)$$

wherein $R_3$ represents H or $CH_3$, and $R_4$ represents an alkyl group having from 4 to 100 carbon atoms.

<10> The positive electrode for a lithium ion secondary battery according to any one of <1> to <9>, wherein the resin comprising a structural unit derived from a nitrile group-containing monomer comprises a structural unit derived from a carboxyl group-containing monomer.

<11> The positive electrode for a lithium ion secondary battery according to any one of <1> to <10>, wherein the fluororesin is polyvinylidene fluoride.

<12> The positive electrode for a lithium ion secondary battery according to any one of <1> to <11>, wherein the positive electrode active material layer comprises a lithium-containing composite metal oxide as a positive electrode active material.

<13> The positive electrode for a lithium ion secondary battery according to any one of <1> to <12>, wherein a packing density of the positive electrode active material layer is from 2.2 g/cm³ to 2.8 g/cm³.

<14> A lithium ion secondary battery, comprising the positive electrode for a lithium ion secondary battery according to any one of <1> to <13>.

Advantageous Effects of Invention

The invention can provide a positive electrode for a lithium ion secondary battery, which has a function of increasing the internal resistance of a lithium ion secondary battery in temperature rise, and which has an excellent discharge rate characteristic during normal operating thereof, as well as a lithium ion secondary battery using the same.

BRIEF DESCRIPTION OF DRAWING

FIG. 1 is a cross-sectional view of a cylindrical lithium ion secondary battery according to the present embodiment.

DESCRIPTION OF EMBODIMENTS

Hereinafter, suitable embodiments of the invention will be described. Any matter necessary for carrying out the invention, other than the matter(s) particularly mentioned in the present description, can be understood as being any design matter by those skilled in the art based on the prior art. The invention can be carried out based on the content disclosed in the description and any common general knowledge in the field. Any dimensional relationship (length, width, thickness, and the like) in the drawing is not intended to reflect any actual dimensional relationship.

Any numerical value range indicated by the term "from X to Y" represents any range including the numerical values described before and after the term "to" as the minimum value and the maximum value, respectively. When a plurality of substances are present in each component of a composition, the content of such a component in the composition means the total amount of the plurality of substances present in the composition, unless especially noted. The term "layer" in the description encompasses not only the configuration of a shape formed on the entire surface, but also the configuration of a shape formed on a part of the surface, when the layer is observed as a plan view.

The technique of the invention can be widely applied to various non-aqueous secondary batteries including an electrode in which an electrode active material is held on a current collector. Such a battery can exert the suppression effect of overheating of the battery by interposing a conductive layer having a PTC function according to the technique of the invention between the current collector and an electrode active material layer, thereby increasing the electrical resistance between the current collector and the electrode active material layer in temperature rise of the battery to allow current to hardly flow. Hereinafter, the invention will be described in more detail with, as main examples, a positive electrode which includes the conductive layer having the PTC function between an electrode active material layer (positive electrode active material layer) including a positive electrode active material, and a current collector, as well as a lithium ion secondary battery including the positive electrode, but a subject of the invention is not intended to be limited to such an electrode or battery.

(Positive Electrode for Lithium Ion Secondary Battery)

A positive electrode for a lithium ion secondary battery of the present embodiment includes a positive electrode current collector, a conductive layer which is disposed directly or indirectly on the positive electrode current collector, and which includes a conductive particle, a polymer particle, and a fluororesin or a resin including a structural unit derived from a nitrile group-containing monomer, and a positive electrode active material layer disposed directly or indirectly on the conductive layer. In the present embodiment, the "structural unit derived from a nitrile group-containing monomer" is a structural unit containing a nitrile group.

The fluororesin or the resin including a structural unit derived from a nitrile group-containing monomer is used in the conductive layer, and whereby the conductive particle is easily dispersed uniformly in the conductive layer, thereby forming a conductive network serving as an electron transfer pathway in the entire conductive layer. In addition, the fluororesin or the resin including a structural unit derived from a nitrile group-containing monomer is used in the conductive layer, thereby enhancing the adhesion force between the current collector and the conductive layer, and the adhesion force between the active material layer and the conductive layer. As a result, in a case in which the positive electrode for a lithium ion secondary battery, including the conductive layer, according to the present embodiment is incorporated to a lithium ion secondary battery, the initial internal resistance can be reduced and the output power of the lithium ion secondary battery can be increased.

In a case in which the conductive layer includes a conductive particle, a polymer particle, and a fluororesin or a resin including a structural unit derived from a nitrile group-containing monomer, the conductive particle is a conductive inorganic particle, the polymer particle is a non-conductive thermoplastic resin particle, and also the thickness of the conductive layer is small, a lithium ion secondary battery using the positive electrode for a lithium ion secondary battery, including the conductive layer, is further enhanced in output power characteristic. That is, a decrease in electron transfer distance in the conductive layer allows the response of electron transfer from the positive electrode active material layer to the current collector to be further uniform. As a result, the output power characteristic of the lithium ion secondary battery is further enhanced. The thickness of the conductive layer is preferably 10 µm or less, more preferably 8 µm or less, still more preferably 6 µm or less, from such viewpoints. The lower limit of the thickness of the conductive layer is not particularly limited, and is preferably 1 µm or more, more preferably 2 µm or more, still more preferably 3 µm or more in terms of film formability.

The conductive layer according to the present embodiment not only has a function of suppressing further heat generation (hereinafter, also referred to as a "PTC function") due to flow of current in the conductive layer being definitely blocked when the temperature of the conductive layer reaches a predetermined temperature as a result of heat generation in the lithium ion secondary battery, but also can improve discharge rate characteristics and charging/discharging cycle characteristics (hereinafter, also referred to as "cycle characteristics").

In the present embodiment, the positive electrode current collector which can be used is any positive electrode current collector commonly used in the field of a lithium ion secondary battery. Specific examples include a sheet or foil containing stainless steel, aluminum, or titanium. In particular, an aluminum sheet or foil is preferable. The thickness of a sheet or foil is not particularly limited, and is, for example, preferably from 1 µm to 500 µm, more preferably from 2 µm to 100 µm, still more preferably from 5 µm to 50 µm.

The conductive layer according to the present embodiment is an aggregate of a mixture of the conductive particle, the polymer particle, and the fluororesin or the resin including a structural unit derived from a nitrile group-containing monomer as described above. The aggregate deforms at a preset temperature (current blocking temperature), and whereby the electrical resistance of the conductive layer is increased, current is blocked, and further heat generation is suppressed. The current blocking temperature can be set, if appropriate, by selecting the type of the polymer particle, the content of the polymer particle, and the like.

Examples of the conductive particle include carbon particles such as graphite, acetylene black, Ketjen black, channel black, furnace black, lamp black, and thermal black, metal particles such as a nickel particle, metal carbides such as WC, $B_4C$, ZrC, NbC, MoC, TiC, and TaC, metal nitrides such as TiN, ZrN, and TaN, and metal silicides such as $WSi_2$ and $MoSi_2$. In particular, the conductive particle is preferably a carbon particle or a metal particle, and is more preferably a carbon particle. The conductive particle can be used singly, or in combination of two or more kinds thereof. The conductive particle which may be used is a conductive particle having the PTC function, and examples thereof include alkaline earth metal titanates such as barium titanate, barium strontium titanate, and barium lead titanate, and a solid solution in which a different metal as a solid is dissolved in an alkaline earth metal titanate.

In a case in which a carbon particle is used as the conductive particle, the average particle size of the primary particle constituting the carbon particle is preferably from 10 nm to 500 nm, more preferably from 15 nm to 200 nm, still more preferably from 20 nm to 100 nm from the viewpoint that battery characteristics can be more enhanced.

The conductive particle is particularly preferably acetylene black having a structure in which a primary particle is linked to some extent. The degree of linking of the primary particle (degree of development of the structure) is preferably from about 5 to 50 in terms of, for example, a shape coefficient calculated by dividing the average length of a chain of the primary particle linked, by the average diameter of the primary particle.

The polymer particle is not particularly limited as long as the polymer particle is a non-conductive thermoplastic resin particle. The polymer particle according to the present embodiment is preferably insoluble or hardly soluble in water and an organic solvent. Examples of such a polymer particle include particles of polyolefins such as polyethylene and polypropylene, and particles of an ethylene-vinyl acetate copolymer (EVA), an ethylene-acrylic acid copolymer, an ethylene-methacrylic acid copolymer, poly(vinyl chloride), poly(vinylidene chloride), poly(vinyl fluoride), poly(vinylidene fluoride), polyamide, polystyrene, polyacrylonitrile, a thermoplastic elastomer, polyethylene oxide, polyacetal, a thermoplastic modified cellulose, polysulfone, poly(methyl (meth)acrylate), a (meth)acrylate-containing copolymer, and an ionomer resin. In particular, the polymer particle is preferably a particle of a polyolefin such as polyethylene or polypropylene. The polymer particle can be used singly, or in combination of two or more kinds thereof. It is particularly preferable to use a polyolefin particle in combination with a particle of a (meth)acrylate-containing copolymer, or a polyolefin particle in combination with a particle of an ionomer resin, from the viewpoint that adhesion strength can be more enhanced. In the present embodiment, the term "(meth)acrylate" means acrylate or methacrylate.

The ionomer resin is a resin obtained by at least partially ionizing a carboxylic acid group of an ethylene-unsaturated carboxylic acid-based copolymer by a metal ion for ionic crosslinking with a metal ion. The unsaturated carboxylic acid forming the copolymer with ethylene is preferably an unsaturated carboxylic acid having from 3 to 9 carbon atoms, and examples thereof include acrylic acid, methacrylic acid, maleic acid, fumaric acid, and vinylbenzoic acid.

The copolymer may also be a copolymer with an unsaturated carboxylic acid ester. Examples of the unsaturated carboxylic acid ester include methyl acrylate, ethyl acrylate, butyl acrylate, 2-ethylhexyl acrylate, methyl methacrylate, butyl methacrylate, butyl maleate, butyl fumarate, vinyl acetate, vinyl propionate, vinyl stearate, and a higher tertiary vinyl ester. The copolymer may also be a copolymer with an α-olefin. Examples of the α-olefin include propylene, butene, pentene, hexene, heptene, methylbutene, methylpentene, vinyl chloride, and vinyl bromide.

Styrene or the like may also be graft-polymerized to the ethylene-unsaturated carboxylic acid-based copolymer. The metal ion applied is sodium, potassium, calcium, barium, zinc, cobalt, nickel, magnesium, copper, lead, or the like which is in the form of a formate, an acetate, a nitrate, a carbonate, a bicarbonate, an oxide, a hydroxide, an alkoxide, or the like.

The ionomer resin is more preferably an aqueous ethylene-based ionomer resin. Examples of the aqueous ethylene-based ionomer resin include an ethylene-methacrylic acid copolymer, an ethylene-acrylic acid copolymer, an ethylene-acrylic acid ester copolymer, and an ethylene acrylic acid polymer-styrene graft copolymer, and examples of the metal ion include sodium, zinc, and magnesium ions.

The ionomer resin is available as any of, for example, CHEMIPEARL (registered trademark) produced by Mitsui Chemicals, Inc., HIMILAN (registered trademark) produced by DU PONT-MITSUI POLYCHEMICALS CO., LTD, and SURLYN A (registered trademark) produced by DuPont. The ethylene-acrylic acid copolymer or the ethylene-acrylic acid ester copolymer is available as any of, for example, NUCREL (registered trademark) and ELVALOY (registered trademark) produced by DU PONT-MITSUI POLYCHEMICALS CO., LTD.

The average particle size of the polymer particle is not particularly limited, and is preferably from 0.05μ to 5 μm, more preferably from 0.1 μm to 5 μm, still more preferably from 0.2 μm to 2 μm, particularly preferably from 0.3 μm to 1 μm from the viewpoint that battery characteristics can be more enhanced.

The content rates of the conductive particle and the polymer particle are not particularly limited, and the mass ratio thereof (conductive particle:polymer particle) is preferably from 2:98 to 20:80, more preferably from 3:97 to 15:85, still more preferably from 5:95 to 10:90. In a case in which the content rate of the conductive particle is 2 or more, the electron transfer pathway in the conductive layer tends to be ensured to allow the output power characteristic of the battery to be enhanced. In a case in which the content rate of the conductive particle is 20 or less, the PTC function tends to be exhibited to allow responsiveness of current blocking to heat generation in the lithium ion secondary battery to be enhanced.

The average particle sizes of the conductive particle and the polymer particle can be each determined as a numerical value obtained by, for example, coating a current collector with a slurry of the conductive particle, the polymer particle, and the fluororesin or the resin including a structural unit derived from a nitrile group-containing monomer dispersed in a solvent, removing the solvent to form a current collector on which a conductive layer of about 5 μm in thickness is formed, taking an image of the central portion which has a size of 10 μm in length×10 μm in width of the current collector by a transmission electron microscope, measuring the length values of longer axes of all particles in the image, and arithmetically averaging the values.

The fluororesin or the resin including a structural unit derived from a nitrile group-containing monomer is preferably soluble or easily soluble in an organic solvent.

Examples of the resin including a structural unit derived from a nitrile group-containing monomer include a homopolymer of acrylonitrile, and a copolymer of acrylonitrile with a compound having an ethylenically unsaturated bond. The resin including a structural unit derived from a nitrile group-containing monomer preferably includes a structural unit derived from a nitrile group-containing monomer, and at least one selected from the group consisting of a structural unit derived from a monomer represented by the following Formula (I) and a structural unit derived from a monomer represented by the following Formula (II) (namely, a structural unit derived from a monomer represented by the following Formula (I) and/or a structural unit derived from a monomer represented by the following Formula (II)), from the viewpoint that plasticity and bindability can be more enhanced. In the present embodiment, the "structural unit derived from a monomer represented by Formula (I)" is a structural unit containing a group represented by —CO—(OCH$_2$CH$_2$)$_n$—O—R$_2$ of Formula (I). The "structural unit derived from a monomer represented by Formula (II)" is a structural unit containing a group represented by —COO—R$_4$ of Formula (II). The resin including a structural unit derived from a nitrile group-containing monomer preferably includes a structural unit derived from a carboxyl group-containing monomer from the viewpoint that bindability can be further enhanced. In the present embodiment, the "structural unit derived from a carboxyl group-containing monomer" is a carboxyl group-containing structural unit.

The resin including a structural unit derived from a nitrile group-containing monomer more preferably includes a structural unit derived from a nitrile group-containing monomer, a structural unit derived from a monomer represented by Formula (I), and a structural unit derived from a carboxyl group-containing monomer:

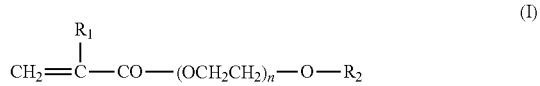

(I)

wherein R$_1$ represents H or CH$_3$, R$_2$ represents H or a monovalent hydrocarbon group, and n represents an integer from 1 to 50; and

(II)

wherein R$_3$ represents H or CH$_3$, and R$_4$ represents an alkyl group having from 4 to 100 carbon atoms.

The nitrile group-containing monomer is not particularly limited, and examples thereof include acrylic-type nitrile group-containing monomers such as acrylonitrile and methacrylonitrile, cyano-type nitrile group-containing monomers such as α-cyano acrylate and dicyanovinylidene, and fumaric-type nitrile group-containing monomers such as fumaronitrile. In particular, acrylonitrile is preferable in terms of ease of polymerization, cost-effectiveness, flexibility of an electrode, plasticity of an electrode, and the like.

Such nitrile group-containing monomers can be used singly, or in combination of two or more kinds thereof. In a case in which acrylonitrile and methacrylonitrile are used in the nitrile group-containing monomer according to the present embodiment, the proportion of acrylonitrile with respect to the total amount of the nitrile group-containing monomer is preferably in a range of from 5% by mass to 95% by mass, more preferably in a range of from 50% by mass to 95% by mass.

The monomer represented by Formula (I) is not particularly limited.

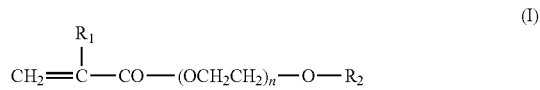

(I)

R$_1$ represents H or CH$_3$. n represents an integer from 1 to 50, preferably an integer from 2 to 30, more preferably an integer from 2 to 10. R$_2$ represents H, or a monovalent hydrocarbon group, and preferably represents a monovalent hydrocarbon group having from 1 to 50 carbon atoms, more preferably a monovalent hydrocarbon group having from 1 to 25 carbon atoms, still more preferably a monovalent hydrocarbon group having from 1 to 12 carbon atoms. In a case in which the number of carbon atoms of the monovalent hydrocarbon group represented by R$_2$ is 50 or less, a sufficient swelling resistance to an electrolytic solution tends to be able to be achieved. Examples of the hydrocarbon group include an alkyl group and a phenyl group. R$_2$ particularly preferably represents an alkyl group having from 1 to 12 carbon atoms, or a phenyl group. The alkyl group may have a straight or branched chain. In a case in which R$_2$ represents an alkyl group or a phenyl group, hydrogen atoms in the alkyl group or the phenyl group may be at least partially substituted with halogen such as fluorine, chlorine, bromine, or iodine, a nitrogen-containing group, a phosphorus-containing group, an aromatic ring, a cycloalkane having from 3 to 10 carbon atoms, or the like.

Specific examples of a commercially available monomer expressed by Formula (I) include ethoxydiethylene glycol acrylate (trade name: LIGHT ACRYLATE EC-A, produced by Kyoeisha Chemical Co., Ltd.), methoxytriethylene glycol acrylate (trade name: LIGHT ACRYLATE MTG-A, produced by Kyoeisha Chemical Co., Ltd.; and trade name: NK ESTER AM-30G, produced by Shin-Nakamura Chemical Co., Ltd.), methoxy poly(n=9) ethylene glycol acrylate (trade name: LIGHT ACRYLATE 130-A, produced by Kyoeisha Chemical Co., Ltd.; and trade name: NK ESTER AM-90G, produced by Shin-Nakamura Chemical Co., Ltd.), methoxy poly(n=13) ethylene glycol acrylate (trade name: NK ESTER AM-130G, produced by Shin-Nakamura Chemical Co., Ltd.), methoxy poly(n=23) ethylene glycol acrylate (trade name: NK ESTER AM-230G, produced by Shin-Nakamura Chemical Co., Ltd.), octoxy poly(n=18) ethylene glycol acrylate (trade name: NK ESTER A-OC-18E, produced by Shin-Nakamura Chemical Co., Ltd.), phenoxydiethylene glycol acrylate (trade name: LIGHT ACRYLATE P-200A, produced by Kyoeisha Chemical Co., Ltd.; and trade name: NK ESTER AMP-20GY, produced by Shin-Nakamura Chemical Co., Ltd.), phenoxy poly(n=6) ethylene glycol acrylate (trade name: NK ESTER AMP-60G, produced by Shin-Nakamura Chemical Co., Ltd.), nonylphenol EO adduct(n=4) acrylate (trade name: LIGHT ACRYLATE NP-4EA, produced by Kyoeisha Chemical Co., Ltd.), nonylphenol EO adduct(n=8) acrylate (trade name: LIGHT ACRYLATE NP-BEA, produced by Kyoeisha Chemical Co., Ltd.), methoxydiethylene glycol methacrylate (trade name: LIGHT ESTER MC, produced by Kyoeisha Chemical Co., Ltd.; and trade name: NK ESTER M-20G, produced by Shin-Nakamura Chemical Co., Ltd.), methoxytriethylene glycol methacrylate (trade name: LIGHT ESTER MTG, produced by Kyoeisha Chemical Co., Ltd.), methoxy poly(n=9) ethylene glycol methacrylate (trade name: LIGHT ESTER 130MA, produced by Kyoeisha Chemical Co., Ltd.; and trade name: NK ESTER M-90G, produced by Shin-Nakamura Chemical Co., Ltd.), methoxy poly(n=23) ethylene glycol methacrylate (trade name: NK ESTER M-230G, produced by Shin-Nakamura Chemical Co., Ltd.), and methoxy poly(n=30) ethylene glycol methacrylate (trade name: LIGHT ESTER 041MA, produced by Kyoeisha Chemical Co., Ltd.). Among them, methoxytriethylene glycol acrylate (in Formula (I), $R_1$ is H, $R_2$ is $CH_3$, and n is 3) is more preferable from the viewpoint of copolymerization reactivity with acrylonitrile, or the like. The monomers expressed by Formula (I) may be used singly or in a combination of two or more kinds thereof. In this regard, "EO" means ethylene oxide.

The monomer represented by Formula (II) is not particularly limited.

(II)

$R_3$ represents H or $CH_3$. $R_4$ represents an alkyl group having from 4 to 100 carbon atoms, preferably an alkyl group having from 4 to 50 carbon atoms, more preferably an alkyl group having from 6 to 30 carbon atoms, and further preferably an alkyl group having from 8 to 15 carbon atoms. When the carbon number of an alkyl group is four or more, sufficient flexibility may be obtained. When the carbon number of an alkyl group is 100 or less, sufficient swelling resistance to an electrolyte solution may be obtained. An alkyl group constituting $R_4$ may be a straight chain, or a branched chain. Further, at least part of hydrogens in an alkyl group constituting $R_4$ may be substituted with a halogen atom, such as fluorine, chlorine, bromine, or iodine, a nitrogen-containing group, a phosphorus-containing group, an aromatic ring, a cycloalkane having from 3 to 10 carbon atoms, or the like. Examples of an alkyl group constituting $R_4$ include a straight chain or branched chain saturated alkyl group as well as a halogenated alkyl group, such as a fluoroalkyl group, a chloroalkyl group, a bromoalkyl group, and an alkyl iodide group.

Specific examples of a monomer expressed by Formula (II) include a (meth)acrylic acid ester, such as n-butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tridecyl (meth)acrylate, hexadecyl (meth)acrylate, stearyl (meth)acrylate, isostearyl (meth)acrylate, cyclohexyl (meth)acrylate, and isobornyl (meth)acrylate. Further, when $R_4$ is a fluoroalkyl group, examples of the monomer include an acrylate compound, such as 1,1-bis(trifluoromethyl)-2,2,2-trifluoroethyl acrylate, 2,2,3,3,4,4,4-heptafluorobutyl acrylate, 2,2,3,4,4,4-hexafluorobutyl acrylate, nonafluoroisobutyl acrylate, 2,2,3,3,4,4,5,5-octafluoropentyl acrylate, 2,2,3,3,4,4,5,5-nonafluoropentyl acrylate, 2,2,3,3,4,4,5,5,6,6,6-undecafluorohexyl acrylate, 2,2,3,3,4,4,5,5,6,6,7,7,8,8,8-pentadecafluorooctyl acrylate, 3,3,4,4,5,5,6,6,7,7,8,8,9,9,10,10,10-heptadecafluorodecyl acrylate, and 2,2,3,3,4,4,5,5,6,6,7,7,8,8,9,9,10,10,10-nonadecafluorodecyl acrylate; and a methacrylate compound, such as nonafluoro-t-butyl methacrylate, 2,2,3,3,4,4,4-heptafluorobutyl methacrylate, 2,2,3,3,4,4,5,5-octafluoropentyl methacrylate, 2,2,3,3,4,4,5,5,6,6,7,7-dodecafluoroheptyl methacrylate, heptadecafluorooctyl methacrylate, 2,2,3,3,4,4,5,5,6,6,7,7,8,8,8-pentadecafluorooctyl methacrylate, and 2,2,3,3,4,4,5,5,6,6,7,7,8,8,9,9-hexadecafluorononyl methacrylate. The monomers expressed by Formula (II) may be used singly or in a combination of two or more kinds thereof.

The carboxyl group-containing monomer is not particularly limited. Examples of the carboxyl group-containing monomer include acrylic-type carboxyl group-containing monomers such as acrylic acid and methacrylic acid, crotonic-type carboxyl group-containing monomers such as crotonic acid, maleic-type carboxyl group-containing monomers such as maleic acid and anhydride thereof, itaconic-type carboxyl group-containing monomers such as itaconic acid and anhydride thereof, and citraconic-type carboxyl group-containing monomers such as citraconic acid and anhydride thereof. In particular, acrylic acid is preferable in terms of ease of polymerization, cost-effectiveness, flexibility of an electrode, plasticity of an electrode, and the like. Such carboxyl group-containing monomers can be used singly, or in combination of two or more kinds thereof. In a case in which acrylic acid and methacrylic acid are used in the carboxyl group-containing monomer, acrylic acid is preferably included in an amount of from 5% by mass to 95% by mass, more preferably from 50% by mass to 95% by mass with respect to the total amount of the carboxyl group-containing monomer.

The resin including a structural unit derived from a nitrile group-containing monomer according to the present embodiment may include, if appropriate, in addition to the structural unit derived from a nitrile group-containing monomer, the structural unit derived from a carboxyl group-containing monomer, and at least one selected from the group consisting of the structural unit derived from a monomer represented by Formula (I) and the structural unit derived from a monomer represented by Formula (II), a structural unit derived from a monomer other than the above monomers. Such other monomer is not particularly limited. Examples of such other monomer include short-chain (meth)acrylic acid ester compounds such as methyl (meth)acrylate, ethyl (meth)acrylate, and propyl (meth)acrylate, vinyl halide compounds such as vinyl chloride, vinyl bromide, and vinylidene chloride, styrenic compounds such as styrene, α-methylstyrene, and sodium styrenesulfonate, imide compounds such as maleimide and N-phenylmaleimide, amide compounds such as (meth)acrylamide, vinyl acetate, sodium (meth)allylsulfonate, sodium (meth)allyloxybenzenesulfonate, 2-acrylamide-2-methylpropanesulfonic acid, and a salt thereof. Such other monomers can be used singly, or in combination of two or more kinds thereof. The term "(meth)allyl" means allyl or methallyl.

In a case in which the resin includes the structural unit derived from a nitrile group-containing monomer, the structural unit derived from a carboxyl group-containing monomer, and at least one selected from the group consisting of the structural unit derived from a monomer represented by Formula (I) and the structural unit derived from a monomer represented by Formula (II), the molar ratio among the structural unit derived from a nitrile group-containing monomer, the structural unit derived from a carboxyl group-containing monomer, and the total of at least one selected from the group consisting of the structural unit derived from a monomer represented by Formula (I) and the structural unit derived from a monomer represented by Formula (II) is, for example, as follows: the ratio of the structural unit derived from a carboxyl group-containing monomer is preferably from 0.01 mol to 0.2 mol, more preferably from 0.02 mol to 0.1 mol, still more preferably from 0.03 mol to 0.06 mol, and the ratio of the total of at least one selected from the group consisting of the structural unit derived from a monomer represented by Formula (I) and the structural unit derived from a monomer represented by Formula (II) is preferably from 0.001 mol to 0.2 mol, more preferably from 0.003 mol to 0.05 mol, still more preferably from 0.005 mol to 0.02 mol, with respect to 1 mol of the structural unit derived from a nitrile group-containing monomer.

The ratio of the structural unit derived from a carboxyl group-containing monomer is preferably from 0.01 mol to 0.2 mol, and the ratio of the total of the structural unit derived from a monomer represented by Formula (I) and the structural unit derived from a monomer represented by Formula (II) is preferably from 0.001 mol to 0.2 mol, the ratio of the structural unit derived from a carboxyl group-containing monomer is more preferably from 0.02 mol to 0.1 mol, and the ratio of the total of the structural unit derived from a monomer represented by Formula (I) and the structural unit derived from a monomer represented by Formula (II) is more preferably from 0.003 mol to 0.05 mol, and the ratio of the structural unit derived from a carboxyl group-containing monomer is still more preferably from 0.03 mol to 0.06 mol, and the ratio of the total of the structural unit derived from a monomer represented by Formula (I) and the structural unit derived from a monomer represented by Formula (II) is still more preferably from 0.005 mol to 0.02 mol, with respect to 1 mol of the structural unit derived from a nitrile group-containing monomer.

In a case in which the ratio of the structural unit derived from a carboxyl group-containing monomer is from 0.01 mol to 0.2 mol and the ratio of the total of at least one selected from the group consisting of the structural unit derived from a monomer represented by Formula (I) and the structural unit derived from a monomer represented by Formula (II) is from 0.001 mol to 0.2 mol, with respect to 1 mol of the structural unit derived from a nitrile group-containing monomer, adhesiveness with the current collector, in particular, a negative electrode current collector using copper foil, and swelling resistance to an electrolytic solution are excellent, and flexibility of an electrode and plasticity of an electrode are favorable.

In a case in which the resin includes a structural unit derived from other monomer, the ratio of the structural unit derived from other monomer is preferably from 0.005 mol to 0.1 mol, more preferably from 0.01 mol to 0.06 mol, still more preferably from 0.03 mol to 0.05 mol, with respect to 1 mol of the structural unit derived from a nitrile group-containing monomer.

Examples of the fluororesin include polyvinylidene fluoride, polytetrafluoroethylene, a polytetrafluoroethylene-ethylene copolymer, and a polytetrafluoroethylene-vinylidene fluoride copolymer. Polyvinylidene fluoride is preferably used from the viewpoint of an increase in density.

The content rate of the total amount of the conductive particle and the polymer particle with respect to the fluororesin or the resin including a structural unit derived from a nitrile group-containing monomer included in the conductive layer, are not particularly limited, and the mass ratio (the total of the conductive particle and the polymer particle:the resin) is preferably from 99.9:0.1 to 95:5, more preferably from 99.5:0.5 to 97:3, still more preferably from 99.5:0.5 to 98:2. In a case in which the content rate of the fluororesin or the resin including a structural unit derived from a nitrile group-containing monomer is 0.1 or more, there are the following tendencies: the conductive particle is sufficiently dispersed, the electron transfer pathway in the conductive layer is sufficiently ensured, and battery characteristics are enhanced. In a case in which the content rate of the fluororesin or the resin including a structural unit derived from a nitrile group-containing monomer is 5 or less, there are the following tendencies: the viscosity of the resulting dispersion liquid is decreased and coating of the current collector is facilitated.

The current blocking temperature of the conductive layer is preferably set to from 70° C. to 180° C., more preferably from 80° C. to 160° C. In a case in which the current blocking temperature is set to from 70° C. to 180° C., current blocking and thus suppression of heat generation can be achieved even in temperature rise caused by the occurrence of abnormality in the lithium ion secondary battery by itself or various instruments to which the lithium ion secondary battery is mounted. Furthermore, power supply from the lithium ion secondary battery to various instruments can be stopped, and therefore a very high safety is achieved. In a case in which the current blocking temperature is set to from 80° C. to 160° C., the following advantages can be obtained: no malfunction is caused in ordinary use and current can be certainly blocked in abnormality such as overcharging. Such a current blocking temperature depends on the melting point of the polymer particle.

The melting point of the polymer particle is preferably from 60° C. to 180° C., more preferably from 80° C. to 160° C. because a lower melting point can allow current to be blocked at a low temperature in heat generation in the battery and a higher melting point can allow the drying temperature in formation of the conductive layer and the positive electrode active material layer to be higher, and productivity can be thus more enhanced. The melting point of the polymer particle can be calculated from an endothermic peak temperature obtained by measuring the specific heat capacity of the particle in an inert gas as a function of the temperature with a differential scanning calorimeter.

In a case in which the current blocking temperature is set to from 70° C. to 140° C., a polyethylene particle is preferably used as the polymer particle. In a case in which the current blocking temperature is set to from 140° C. to 180° C., a polypropylene particle is preferably used as the polymer particle.

The thickness of the conductive layer is preferably from 1 μm to 10 μm, more preferably from 2 μm to 8 μm, still more preferably from 3 μm to 6 μm from the viewpoint that battery characteristics and the PTC function are simultaneously obtained.

The positive electrode active material layer may be formed on one or both surfaces of the positive electrode current collector in the thickness direction, may contain a positive electrode active material, and may contain a conductive material, a binding material, and the like, if necessary. The positive electrode active material which can be used is any material commonly used in the art, and examples thereof include a lithium-containing composite metal oxide, an olivine type lithium salt, a chalcogen compound, and manganese dioxide. The lithium-containing composite metal oxide is a metal oxide which includes lithium and a transition metal, or the metal oxide in which the transition metal is partially replaced with a different element. Examples of the different element include Na, Mg, Sc, Y, Mn, Fe, Co, Ni, Cu, Zn, Al, Cr, Pb, Sb, V, and B, and Mn, Al, Co, Ni, Mg, or the like is preferable. Such different elements can be used singly, or in combination of two or more kinds thereof.

In particular, the positive electrode active material is preferably a lithium-containing composite metal oxide. Examples of the lithium-containing composite metal oxide include $Li_xCoO_2$, $Li_xNiO_2$, $Li_xMnO_2$, $Li_xCo_yNi_{1-y}O_2$, $Li_xCo_yM^1_{1-y}O_z$ (in $Li_xCo_yM^1_{1-y}O_z$, $M^1$ represents at least one element selected from the group consisting of Na, Mg, Sc, Y, Mn, Fe, Ni, Cu, Zn, Al, Cr, Pb, Sb, V, and B.), $Li_xNi_{1-y}M^2_yO_z$ (in $Li_xNi_{1-y}M^2_yO_z$, $M^2$ represents at least one element selected from the group consisting of Na, Mg, Sc, Y, Mn, Fe, Co, Cu, Zn, Al, Cr, Pb, Sb, V, and B.), $Li_xMn_2O_4$, and $Li_xMn_{2-y}M^3_yO_4$ (in $Li_xMn_{2-y}M^3_yO_4$, $M^3$ represents at least one element selected from the group consisting of Na, Mg, Sc, Y, Fe, Co, Ni, Cu, Zn, Al, Cr, Pb, Sb, V, and B.). In each formula, x represents from 0 to 1.2, y represents from 0 to 0.9, and z represents from 2.0 to 2.3. The x-value representing the molar ratio of lithium is increased or decreased depending on charging/discharging. Examples of the olivine type lithium salt include $LiFePO_4$. Examples of the chalcogen compound include titanium disulfide and molybdenum disulfide. Such positive electrode active materials can be used singly, or in combination of two or more kinds thereof.

The positive electrode active material preferably includes a lithium manganese oxide represented by $Li_xMn_2O_4$ or $Li_xMn_{2-y}M^3_yO_4$ (in $Li_xMn_{2-y}M^3_yO_4$, $M^3$ represents at least one element selected from the group consisting of Na, Mg, Sc, Y, Fe, Co, Ni, Cu, Zn, Al, Cr, Pb, Sb, V, and B.) in terms of safety. In a case in which a lithium manganese oxide is used as the positive electrode active material, the content of the lithium manganese oxide is preferably 30% by mass or more, more preferably 40% by mass or more with respect to the total amount of the positive electrode active material.

Examples of the conductive material which may be used in the positive electrode active material layer include carbon black, graphite, a carbon fiber, and a metal fiber. Examples of the carbon black include acetylene black, Ketjen black, channel black, furnace black, lamp black, and thermal black. Examples of the graphite include natural graphite and artificial graphite. Such conductive materials can be used singly, or in combination of two or more kinds thereof.

Examples of the binding material which may be used in the positive electrode active material layer include polyethylene, polypropylene, polyvinyl acetate, polymethyl methacrylate, nitrocellulose, a fluororesin, and a rubber particle. Examples of the fluororesin include polytetrafluoroethylene (PTFE), polyvinylidene fluoride (PVDF), a tetrafluoroethylene-hexafluoropropylene copolymer (FEP), and a vinylidene fluoride-hexafluoropropylene copolymer. Examples of the rubber particle include a styrene-butadiene rubber particle and an acrylonitrile rubber particle. In particular, a binding material containing fluorine is preferable in consideration of e.g. an enhancement in oxidation resistance of the positive electrode active material layer. Such binding materials can be used singly, or in combination of two or more kinds thereof, if necessary.

The positive electrode active material layer can be formed by, for example, coating the conductive layer with a positive electrode mixture paste, drying the resultant to form a coating layer, and, if necessary, rolling the coating layer. The positive electrode mixture paste can be prepared by adding the positive electrode active material, together with the binding material, the conductive material, and the like, to a dispersing medium, and mixing the resultant. The dispersing medium which can be used is, for example, any of N-methyl-2-pyrrolidone (NMP), tetrahydrofuran, and dimethylformamide. Any dispersing medium is preferably selected which does not dissolve the polymer particle contained in the conductive layer. A certain polymer particle is hardly dissolved in both of an organic solvent and water. In a case in which such a polymer particle is used, it is not necessary to select the type of the dispersing medium.

When the positive electrode active material layer including the positive electrode active material, the conductive material, and the binding material, of the lithium ion secondary battery of the present embodiment, is formed, the packing density of the positive electrode active material layer is preferably in a range from 2.2 $g/cm^3$ to 2.8 $g/cm^3$, more preferably in a range from 2.3 $g/cm^3$ to 2.7 $g/cm^3$, still more preferably in a range from 2.4 $g/cm^3$ to 2.6 $g/cm^3$. In a case in which the packing density of the positive electrode active material layer is 2.8 $g/cm^3$ or less, a non-aqueous electrolyte tends to easily penetrate into the positive electrode active material layer, thereby promoting diffusion of a lithium ion during charging/discharging at a high current and enhancing cycle characteristic. In a case in which the packing density of the positive electrode active material layer is 2.2 $g/cm^3$ or more, the contact of the positive electrode active material and the conductive material tends to be sufficiently ensured, thereby reducing electrical resistance and enhancing discharge rate characteristic.

In a case in which the positive electrode of the lithium ion secondary battery of the present embodiment is produced by coating the positive electrode current collector with the positive electrode mixture paste, the amount of the positive electrode mixture paste used for coating, after drying of the dispersing medium (positive electrode active material layer), is preferably in a range from 100 $g/m^2$ to 300 $g/m^2$, more preferably in a range from 150 $g/m^2$ to 250 $g/m^2$, still more preferably in a range from 180 $g/m^2$ to 220 $g/m^2$. In a case in which the amount of the positive electrode mixture paste used for coating is 100 $g/m^2$ or more, the positive electrode active material layer is not too thinner, and a sufficient battery capacity is achieved. In a case in which the amount of the positive electrode mixture paste used for coating is 300 $g/m^2$ or less, the positive electrode active material layer is not too thicker, and cycle characteristic is enhanced without any occurrence of an uneven reaction in the thickness direction in the case of charging/discharging at a high current.

The thickness of the positive electrode active material layer is preferably from 50 μm to 150 μm, more preferably from 60 μm to 120 μm, still more preferably from 70 μm to 110 μm, in terms of discharge capacity and discharge rate characteristic.

(Lithium Ion Secondary Battery)

The lithium ion secondary battery of the present embodiment can have the same configuration as that of a conventional lithium ion secondary battery except for the positive electrode. For example, the lithium ion secondary battery of the present embodiment includes a positive electrode, a negative electrode, a separator, and a non-aqueous electrolyte.

The positive electrode is disposed so as to be opposite to the negative electrode with the separator interposed therebetween, and includes a positive electrode current collector, a conductive layer, and a positive electrode active material layer. The positive electrode provided is a positive electrode for the lithium ion secondary battery of the present embodiment.

The negative electrode is disposed so as to be opposite to the positive electrode with the separator interposed therebetween, and includes a negative electrode current collector and a negative electrode active material layer. Examples of the negative electrode current collector include a sheet or foil including stainless steel, nickel, or copper. The thickness of a sheet or foil is not particularly limited. The thickness of the sheet or foil is, for example, preferably from 1 μm to 500 μm, more preferably from 2 μm to 100 μm, still more preferably from 5 μm to 50 μm. The negative electrode active material layer is formed on one or both surfaces of the negative electrode current collector in the thickness direction, contains a negative electrode active material, and may contain a binding material, a conductive material, a thickener, and the like, if necessary.

The negative electrode active material which can be used is any material which is capable of absorbing and releasing a lithium ion and which is commonly used in the field of a lithium ion secondary battery. Examples of the negative electrode active material include metallic lithium, a lithium alloy, an intermetallic compound, a carbon material, an organic compound, an inorganic compound, a metal complex, and an organic polymer compound. Such negative electrode active materials can be used singly, or in combination of two or more kinds thereof. In particular, the negative electrode active material is preferably a carbon material. Examples of the carbon material include graphites such as natural graphite (for example, scale-like graphite) and artificial graphite, carbon blacks such as acetylene black, Ketjen black, channel black, furnace black, lamp black, and thermal black, and a carbon fiber. The volume average particle size of the carbon material is preferably from 0.1 μm to 60 μm, more preferably from 0.5 μm to 30 μm. The BET specific surface area of the carbon material is preferably from 1 $m^2/g$ to 10 $m^2/g$. The carbon material is particularly preferably graphite in which the distance ($d_{002}$) between carbon hexagonal planes according to wide-angle X-ray diffractometry is from 3.35 Å to 3.40 Å and the crystallite (Lc) in the c-axis direction is 100 Å or more, from the viewpoint that the discharge capacity of the battery can be more enhanced.

The carbon material is particularly preferably amorphous carbon in which the distance ($d_{002}$) between carbon hexagonal planes according to wide-angle X-ray diffractometry is from 3.5 Å to 3.95 Å, from the viewpoint that cycle characteristic and safety can be more enhanced.

A BET specific surface area may be measured, for example, based on a nitrogen adsorption capacity according to JIS Z 8830:2013. As a measuring apparatus, for example, an AUTOSORB-1 (trade name) produced by Quantachrome Instruments may be used. In measuring a BET specific surface area, moisture adsorbed on a surface of a sample or in the structure thereof may conceivably influence the gas adsorption capacity, and therefore a pretreatment for removing moisture by heating is preferably conducted firstly. In the pretreatment, a measurement cell loaded with 0.05 g of a measurement sample is evacuated by a vacuum pump to 10 Pa or less, then heated at 110° C. for a duration of 3 hours or longer, and cooled naturally to normal temperature (25° C.) while maintaining the reduced pressure. After the pretreatment, the measurement temperature is lowered to 77K and a measurement is conducted in a measurement pressure range of less than 1 in terms of relative pressure (namely, an equilibrium pressure with respect to a saturated vapor pressure).

The distance ($d_{002}$) between carbon hexagonal planes can be calculated by using the Bragg's equation from the diffraction peak corresponding to a carbon 002 plane, appearing around a diffraction angle 2θ of 24° to 26°, in the diffraction profile obtained by irradiation of a carbon particle powder sample with an X-ray (CuKα ray) and measurement of a diffraction line with a goniometer.

The conductive material which may be used in the negative electrode active material layer can be the same as the conductive material contained in the positive electrode active material layer. The binding material which may be used in the negative electrode active material layer can be the same as that commonly used in the field of a lithium ion secondary battery. Examples include polyethylene, polypropylene, polytetrafluoroethylene, polyvinylidene fluoride, styrene-butadiene rubber, and acrylic rubber. Examples of the thickener which may be used in the negative electrode active material layer include carboxymethylcellulose. The negative electrode active material layer can be formed by, for example, coating a negative electrode current collector surface with a negative electrode mixture paste, drying the resultant to form a coating layer, and, if necessary, rolling the coating layer. The negative electrode mixture paste can be prepared by, for example, adding the negative electrode active material, if necessary, together with the binding material, the conductive material, the thickener, and the like, to a dispersing medium, and mixing the resultant. The dispersing medium which can be used is, for example, any of N-methyl-2-pyrrolidone (NMP) and water.

The separator is disposed so as to be interposed between the positive electrode and the negative electrode, thereby insulating the positive electrode and the negative electrode. The separator which can be used is any separator having ion permeability, such as an inorganic porous membrane. The separator which can be used is any separator commonly used in the field of a lithium ion secondary battery, and examples thereof include a resinous porous sheet. Examples of a resin forming the resinous porous sheet include polyolefins such as polyethylene and polypropylene, polyamide, and polyamideimide. Examples of the resinous porous sheet also include a nonwoven fabric and a woven fabric. In particular, a porous sheet in which the diameter of a pore formed therein is from about 0.05 μm to 0.15 μm. Such a porous sheet simultaneously has ion permeability, mechanical strength, and insulation property. The thickness of the porous sheet is not particularly limited.

The inorganic porous membrane mainly contains an inorganic compound, and has a high heat resistance. Examples of the inorganic compound include inorganic oxides such as alumina and silica, inorganic nitrides such as BN and $Si_3N_4$, and porous inorganic compounds such as zeolite. Such inorganic compounds can be used singly, or in combination of two or more kinds thereof. The inorganic porous membrane may further include a heat-resistant resin. The heat-resistant resin is not particularly limited. Examples of the heat-resistant resin include polyamide and polyimide. The thickness of the inorganic porous membrane is not particularly limited. The thickness of the inorganic porous membrane is preferably from 0.5 μm to 30 μm, more preferably from 1 μm to 20 μm.

Examples of the non-aqueous electrolyte include a liquid non-aqueous electrolyte, a gel non-aqueous electrolyte, and a solid electrolyte (such as polymer solid electrolyte). The liquid non-aqueous electrolyte includes a solute (supporting electrolyte) and a non-aqueous solvent, and further includes, if necessary, various additives. The solute is usually dissolved in the non-aqueous solvent. The separator is, for example, impregnated with the liquid non-aqueous electrolyte.

The solute which can be used is any solute commonly used in the art, and examples thereof include $LiClO_4$, $LiBF_4$, LiPF$_6$, LiAlCl$_4$, LiSbF$_6$, LiSCN, LiCF$_3$SO$_3$, LiCF$_3$CO$_2$, LiAsF$_6$, LiB$_{10}$Cl$_{10}$, a lithium lower-aliphatic carboxylate, LiCl, LiBr, LiI, chloroborane lithium, a borate, and an imide salt. Examples of the borate include lithium bis(1,2-benzenediolate (2-)—O,O')borate, lithium bis(2,3-naphthalenediolate (2-)—O,O')borate, lithium bis(2,2'-biphenyldiolate (2-)—O,O')borate, and lithium bis(5-fluoro-2-olate-1-benzenesulfonic acid-O,O')borate. Examples of the imide salt include lithium bis(trifluoromethane)sulfonimide ((CF$_3$SO$_2$)$_2$NLi), lithium trifluoromethanesulfonate nonafluorobutanesulfonimide ((CF$_3$SO$_2$)(C$_4$F$_9$SO$_2$)NLi), and lithium bis(pentafluoroethane)sulfonimide ((C$_2$F$_5$SO$_2$)$_2$NLi). Such solutes can be used singly, or in combination of two or more kinds thereof, if necessary. The amount of the solute dissolved in the non-aqueous solvent is preferably from 0.5 mol/L to 2 mol/L.

The non-aqueous solvent which can be used is any non-aqueous solvent commonly used in the art. Examples include a cyclic carbonic acid ester, a chain carbonic acid ester, and a cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Such non-aqueous solvents can be used singly, or in combination of two or more kinds thereof.

The non-aqueous solvent preferably contains vinylene carbonate (VC) from the viewpoint that battery characteristics can be more enhanced.

In a case in which the non-aqueous solvent contains vinylene carbonate (VC), the content of the vinylene carbonate is preferably from 0.1% by mass to 2% by mass, more preferably from 0.2% by mass to 1.5% by mass with respect to the total amount of the non-aqueous solvent.

An embodiment in which the present embodiment is applied to a laminate type battery will be described below.

A laminate type lithium ion secondary battery can be produced as follows, for example. First, a positive electrode and a negative electrode are cut to a rectangular shape, and a tab is welded to each of the electrodes to produce a positive electrode terminal and a negative electrode terminal. The positive electrode, a separator, and the negative electrode are layered in this order to produce a laminated body, the laminated body is accommodated in an aluminum laminate package as it is, the positive electrode terminal and the negative electrode terminal are extended out of the aluminum laminate package, and the laminate package is sealed. A non-aqueous electrolyte is then injected into the aluminum laminate package, and the opening of the aluminum laminate package is sealed. A lithium ion secondary battery is thus obtained.

Next, an embodiment in which the present embodiment is applied to a 18650-type cylindrical lithium ion secondary battery will be described with reference to the drawing.

A lithium ion secondary battery 1 of the present embodiment has a cylindrical battery container 6 which is made of nickel-plated steel and which has a bottom, as illustrated in FIG. 1. The battery container 6 accommodates an electrode group 5 in which belt-shaped positive electrode plate 2 and negative electrode plate 3 are wound spirally in cross section with a separator 4 interposed therebetween. The electrode group 5 includes the positive electrode plate 2 and the negative electrode plate 3 wound spirally in cross section with a polyethylene porous sheet as the separator 4 interposed therebetween. The separator 4 is set so as to have a width of 58 mm and a thickness of 30 μm, for example. A ribbon-shaped positive electrode tab terminal whose one end is fixed to the positive electrode plate 2 and which is made of aluminum is protruded from the upper end surface of the electrode group 5. The other end of the positive electrode tab terminal is joined by ultrasonic welding to the lower surface of a disc-shaped battery lid which is disposed above the electrode group 5 and which serves as positive electrode external terminal. A ribbon-shaped negative electrode tab terminal whose one end is fixed to the negative electrode plate 3 and which is made of copper is protruded from the lower end surface of the electrode group 5. The other end of the negative electrode tab terminal is joined by resistance welding to the inside bottom of the battery container 6. Accordingly, the positive electrode tab terminal and the negative electrode tab terminal are protruded oppositely to each other from both the end surfaces of the electrode group 5. The entire outer circumference surface of the electrode group 5 is provided with an insulation coating whose illustration is omitted. The battery lid is fixed to the upper portion of the battery container 6 by calking via a resinous insulation gasket. The inside of the lithium ion secondary battery 1 is thus sealed. A non-aqueous electrolytic solution not illustrated is injected into the battery container 6.

The increase rate of the direct-current resistance at 120° C. with respect to the direct-current resistance at 25° C. in a lithium ion secondary battery including the conductive layer according to the present embodiment is preferably 110% or more, more preferably 130% or more, still more preferably 150% or more, in view of a usage environment.

The lithium ion secondary battery of the present embodiment has a high safety and also has a high output power, and can be suitably used in the same application as that of a conventional non-aqueous electrolyte secondary battery. The battery of the present embodiment can be suitably used particularly as a power supply for various mobile electronic instruments such as a mobile phone, a laptop, a mobile information terminal, an electronic dictionary, and a video game instrument. In a case in which the lithium ion secondary battery of the present embodiment is used in such applications, the lithium ion secondary battery allows heat generation to be suppressed, even when being in an overcharging state by any chance, and whereby the lithium ion secondary battery is prevented from being heated up, swollen, or the like. The lithium ion secondary battery of the present embodiment can also be utilized in applications of power storage, transport equipment such as an electric car and a hybrid car, and the like.

EXAMPLES

Hereinafter, the invention will be specifically described with reference to Examples and Comparative Examples. The invention is not intended to be limited to the following Examples.

Example 1

(1) Production of Conductive Layer

Acetylene black (conductive particle, trade name: HS-100, average particle size: 48 nm (value in a catalog of Denki Kagaku Kogyo Kabushiki Kaisha), produced by Denki Kagaku Kogyo Kabushiki Kaisha), polyethylene particle (polymer particle, trade name: CHEMIPEARL (registered trademark) W4005, average particle size: 0.6 μm (value in a catalog of Mitsui Chemicals, Inc.), produced by Mitsui Chemicals, Inc., water as a dispersing medium was replaced with NMP), and a solution (produced by Hitachi Chemical Co., Ltd., trade name: LSR7) of a copolymer, in which acrylic acid and a straight ether group (structural unit derived from a monomer represented by Formula (I)) were added to a polyacrylonitrile backbone, in NMP were mixed and dispersed such that the mass ratio (acetylene black: polyethylene particle:LSR7) of solid contents was 5:94:1. NMP was added to the resulting mixture to produce a paste for a conductive layer. One surface of an aluminum foil (positive electrode current collector, produced by Mitsubishi Aluminum Co., Ltd.) having a thickness of 17 μm was coated with the paste for a conductive layer, and the resultant was dried at 60° C. to produce a conductive layer having a thickness of 5 μm.

(2) Production of Positive Electrode 90 parts by mass of $LiCoO_2$ (positive electrode active material), 4.5 parts by mass of acetylene black (conductive material, trade name: HS-100, average particle size: 48 nm (value in a catalog of Denki Kagaku Kogyo Kabushiki Kaisha), produced by Denki Kagaku Kogyo Kabushiki Kaisha), 26.7 parts by mass of a solution (binding material, solid content: 12% by mass) of polyvinylidene fluoride in NMP, and 4.2 parts by mass of NMP were sufficiently mixed to prepare a positive electrode mixture paste. A conductive layer surface formed on the positive electrode current collector was coated with the positive electrode mixture paste, and the resultant was dried at 60° C. to form a coating layer. Thereafter, the coating layer was rolled to form a positive electrode active material layer having a thickness of 75 μm, an amount of coating of 200 g/m$^2$, and a packing density of the positive electrode active material layer of 2.55 g/cm$^3$, thereby producing a positive electrode.

(3) Production of Laminate Type Battery

The positive electrode produced was cut to a rectangular shape of 13.5 cm$^2$, thereby providing an electrode for evaluation. Lithium foil (thickness: 1 mm), a separator which was a polyethylene porous sheet (trade name: HIPORE, produced by Asahi Kasei Corporation, thickness: 30 μm), and the positive electrode cut to a rectangular shape of 13.5 cm$^2$ were stacked to produce a laminated body. The laminated body was placed in an aluminum laminate container (trade name: aluminum laminate film, produced by Dai Nippon Printing Co., Ltd.), 1 mL of a non-aqueous electrolyte (obtained by adding 0.8% by mass of vinylene carbonate to a mixed solution of ethylene carbonate/methyl ethyl carbonate/dimethyl carbonate=2/2/3 (volume ratio), including 1 M $LiPF_6$, with respect to the total amount of the mixed solution, trade name: SOL-RITE, produced by Mitsubishi Chemical Corporation) was added thereto, and the aluminum laminate container was heat-sealed to produce a laminate type battery (the laminate type battery of the present embodiment) for electrode evaluation.

Example 2

A laminate type battery of the present embodiment was produced in the same manner as in Example 1 except that polyacrylonitrile (produced by Wako Pure Chemical Industries, Ltd.) was used in the conductive layer instead of the copolymer in which acrylic acid and a straight ether group were added to a polyacrylonitrile backbone.

Example 3

A laminate type battery of the present embodiment was produced in the same manner as in Example 1 except that a resin obtained by Synthesis Example 1 below was used in the conductive layer instead of the copolymer in which acrylic acid and a straight ether group were added to a polyacrylonitrile backbone.

Synthesis Example 1

A 1.0-L separable flask equipped with a stirrer, a thermometer, and a condenser was charged with 45.0 g of acrylonitrile (produced by Wako Pure Chemical Industries, Ltd.) as a nitrile group-containing monomer, 5.0 g (0.0232 mol with respect to 1 mol of acrylonitrile) of lauryl acrylate (produced by SIGMA-ALDRICH) as a monomer represented by Formula (II), 1.175 mg of potassium persulfate (produced by Wako Pure Chemical Industries, Ltd.) as a polymerization initiator, 135 mg of an α-methylstyrene dimer (produced by Wako Pure Chemical Industries, Ltd.) as a chain transfer agent, and 450 mL of purified water (produced by Wako Pure Chemical Industries, Ltd.) under a nitrogen atmosphere to prepare a reaction liquid. The reaction liquid was vigorously stirred at 60° C. for 3 hours and at 80° C. for 3 hours. The reaction liquid was cooled to room temperature (25° C.) and thereafter subjected to suction filtration, and a resin precipitated was separated by filtration. The resin separated by filtration was washed sequentially with 300 mL of purified water (produced by Wako Pure Chemical Industries, Ltd.) and 300 mL of acetone (produced by Wako Pure Chemical Industries, Ltd.). The resin washed was dried in a vacuum drier at 60° C./1 torr for 24 hours to provide a resin including a structural unit derived from a nitrile group-containing monomer. The resulting resin was dissolved in NMP such that the solid concentration was 7% by mass.

Example 4

A laminate type battery of the present embodiment was produced in the same manner as in Example 1 except that the thickness of the conductive layer was changed to 7 μm.

Example 5

A laminate type battery of the present embodiment was produced in the same manner as in Example 1 except that the thickness of the conductive layer was changed to 10 μm.

Example 6

A laminate type battery of the present embodiment was produced in the same manner as in Example 1 except that the ratio of the acetylene black and the polyethylene particle contained was changed to 10:89 on the mass ratio with respect to the solid content.

Example 7

A laminate type battery of the present embodiment was produced in the same manner as in Example 1 except that the ratio of the acetylene black and the polyethylene particle contained was changed to 15:84 on the mass ratio with respect to the solid content.

Example 8

A laminate type battery of the present embodiment was produced in the same manner as in Example 1 except that polyvinylidene fluoride was used as the fluororesin in the conductive layer instead of the copolymer in which acrylic acid and a straight ether group were added to a polyacrylonitrile backbone.

Example 9

A laminate type battery of the present embodiment was produced in the same manner as in Example 1 except that the polyethylene particle was changed to a polymer particle (trade name: CHEMIPERAL (registered trademark) W900, average particle size: 0.6 μm (value in a catalog of Mitsui Chemicals, Inc.), produced by Mitsui Chemicals, Inc.).

Example 10

A laminate type battery of the present embodiment was produced in the same manner as in Example 1 except that the polyethylene particle was changed to a polymer particle (trade name: CHEMIPEARL (registered trademark) WP100, average particle size: 1.0 μm (value in a catalog of Mitsui Chemicals, Inc.), produced by Mitsui Chemicals, Inc.).

Comparative Example 1

A laminate type battery of Comparative Example 1 was produced in the same manner as in Example 1 except that no conductive layer was provided on the positive electrode current collector surface.

Comparative Example 2

A laminate type battery of Comparative Example 2 was produced in the same manner as in Example 1 except that the conductive layer did not include the fluororesin or the resin including a structural unit derived from a nitrile group-containing monomer and the ratio of the acetylene black and the polyethylene particle contained was changed to 5:95 on the mass ratio with respect to the solid content.

Comparative Example 3

A laminate type battery of Comparative Example 3 was produced in the same manner as in Example 1 except that TRITON X as a surfactant (polyoxyethylene (10) octyl phenyl ether, produced by Wako Pure Chemical Industries, Ltd., average molecular weight=646.85) was used instead of the copolymer in which acrylic acid and a straight ether group were added to a polyacrylonitrile backbone, the thickness of the conductive layer was changed to 10 μm, and the ratio of the polyethylene particle and TRITON X contained was 90:5 on the mass ratio with respect to the solid content.

(Evaluation of Battery Characteristics (Discharge Capacity, Discharge Rate, and Cycle Life), and PTC Function)

The discharge capacity, the discharge rate, and the cycle life at 25° C. of the laminate type battery obtained in each of Examples 1 to 10 and Comparative Examples 1 to 3 were measured with a charging/discharging apparatus (TOYO SYSTEM Co., Ltd., trade name: TOSCAT-3200) under the following conditions to provide battery characteristics.

(1) Discharge Capacity

Charging was performed at a constant current and a constant voltage (CCCV) of 0.5 C and 4.2 V, respectively. The charging was terminated under a condition of a current value of 0.01 C. After the charging, discharging was performed to 3 V at a constant current (CC) of 0.5 C, and the discharge capacity was evaluated according to the following evaluation criteria. The unit "C" means "Current value (A)/Battery capacity (Ah)". The results are shown in Table 1 and Table 2.

A: 25 mAh or more
B: 24 mAh or more but less than 25 mAh
C: less than 24 mAh (2) Discharge Rate Characteristic Charging was performed under the same conditions as describe above, the discharge capacity was measured with the discharging current value being varied to 1 C, 3 C, and 5 C, and the value calculated from the following expression was defined as the discharge rate characteristic, and evaluated according to the following criteria. The results are shown in Table 1 and Table 2.

Discharge rate characteristic (%)=(Discharge capacity at 5 C/Discharge capacity at 0.5 C)×100

A: 90% or more
B: 85% or more but less than 90%
C: 80% or more but less than 85%
D: less than 80%

(3) Cycle Life

Charging/discharging was performed at a current value of 1 C at 25° C. for 300 cycles, and the capacity retention rate was measured. The upper limit and the lower limit of the voltage were 4.2 V and 2.7 V, respectively. The capacity retention rate was evaluated according to the following evaluation criteria. The results are shown in Table 1 and Table 2.

(Discharge capacity at $300^{th}$ cycle/Discharge capacity at $1^{st}$ cycle)×100

A: 90% or more
B: 85% or more but less than 90%
C: 80% or more but less than 85%
D: less than 80%

(4) PTC Function (Increase Rate of Resistance)

The laminate type battery obtained in each of Examples 1 to 10 and Comparative Examples 1 to 3 was placed in a constant-temperature bath at 25° C., and the direct-current resistance (DCR) at 25° C. of the laminate type battery was measured and defined as the initial resistance. Next, the constant-temperature bath was heated to 160° C. and kept at 160° C. for 15 minutes, and thereafter the laminate type battery was taken out from the constant-temperature bath. After cooling to 25° C., the direct-current resistance (DCR) was measured and defined as the resistance after keeping at a battery temperature of 160° C. The increase rate (%) of resistance was calculated from the initial resistance and the resistance after keeping at a battery temperature of 160° C. according to the following expression, and used as an index of the PTC function. The increase rate of resistance was evaluated according to the following evaluation criteria. The results are shown in Table 1 and Table 2.

Increase rate of resistance (%)=(Resistance after keeping at battery temperature of 160° C./Initial resistance (25° C.))×100

The direct-current resistance (DCR) was calculated according to the following expression.

Direct-current resistance (DCR)=[$(\Delta V_{1C}-V)(I_{1C}-I)$+ $(\Delta V_{3C}-V)(I_{3C}-I)$+$(\Delta V_{5C}-V)(I_{5C}-I)$]/[$(I_{1C}-I)^2$+ $(I_{3C}-I)^2$+$(I_{5C}-I)^2$]   [Expression 1]

The following relationships: $I=(I_{1C}+I_{3C}+I_{5C})/3$ and $V=(\Delta V_{1C}+\Delta V_{3C}+\Delta V_{5C})/3$; are satisfied, $I_{1C}$, $I_{3C}$, and $I_{5C}$ represent the respective corresponding discharging current values at 1 C, 3 C, and 5 C, and $\Delta V_{1C}$, $\Delta V_{3C}$, and $\Delta V_{5C}$ represent the respective changes of voltages at 10 seconds after the initiation of discharging at the corresponding discharging current values.
A: 150% or more
B: 130% or more but less than 150%
C: 110% or more but less than 130%
D: less than 110%

In Table 1 and Table 2, "AB" means acetylene black, "LSR7" means a copolymer in which acrylic acid and a straight ether group were added to a polyacrylonitrile backbone, and "PAN" means polyacrylonitrile. The number with respect to each component in the Tables represents the compounding ratio (mass ratio) of the component. The symbol "–" with respect to the composition of the conductive layer means that no relevant component is compounded. The symbol "*" means that the conductive layer was difficult to form and no evaluation could be performed.

of resistance at 160° C. It has been supposed from those that the lithium ion secondary battery of the present embodiment can allow heat generation to be suppressed due to blocking of current by an increase in resistance during heat generation by overcharging or the like. It is thus demonstrated that the lithium ion secondary battery of the present embodiment has an excellent safety.

The battery in Comparative Example 2 having no polymer serving as a binder could not have any conductive layer formed because the conductive particle and the polymer particle could not be dispersed in NMP. The battery in Comparative Example 3 (corresponding to Examples in JP-A No. 2009-176599) in which the surfactant was used instead of the fluororesin or the resin including a structural unit derived from a nitrile group-containing monomer was insufficient in battery characteristics. It was found from further studies by the inventors that the composition in

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Composition of conductive layer | Conductive particle | AB (average particle size: 48 nm) | 5 | 5 | 5 | 5 | 5 | 10 | 15 | 5 | 5 | 5 |
| | Polymer particle | Polyethylene particle | 94 | 94 | 94 | 94 | 94 | 89 | 84 | 94 | 94 | 94 |
| | Resin including structural unit derived from nitrile group-containing monomer | LSR7 | 1 | — | — | 1 | 1 | 1 | 1 | — | 1 | 1 |
| | | PAN | — | 1 | — | — | — | — | — | — | — | — |
| | | Synthesis Example 1 | — | — | 1 | — | — | — | — | — | — | — |
| | Fluororesin | PVDF | — | — | — | — | — | — | — | 1 | — | — |
| | Surfactant | TRITON X | — | — | — | — | — | — | — | — | — | — |
| | Type of polymer particle | | W4005 | W4005 | W4005 | W4005 | W4005 | W4005 | W4005 | W4005 | W900 | WP100 |
| | Thickness (μm) of conductive layer | | 5 | 5 | 5 | 7 | 10 | 5 | 5 | 5 | 5 | 5 |
| Battery characteristics | Discharge capacity | | A | A | A | A | A | A | A | A | A | A |
| | Discharge rate | | A | A | A | B | C | A | A | A | A | A |
| | Cycle life | | A | A | A | A | A | A | A | C | A | A |
| PTC function | Increase rate of resistance | | A | A | A | A | A | B | C | A | A | A |

TABLE 2

| | | | Comparative Examples | | |
|---|---|---|---|---|---|
| | | | 1 | 2 | 3 |
| Composition of conductive layer | Conductive particle | AB (average particle size: 48 nm) | — | 5 | 5 |
| | Polymer particle | Polyethylene particle | — | 95 | 90 |
| | Resin including structural unit derived from nitrile group-containing monomer | LSR7 | — | — | — |
| | | PAN | — | — | — |
| | | Synthesis Example 1 | — | — | — |
| | Fluororesin | PVDF | — | — | — |
| | Surfactant | TRITON X | — | — | 5 |
| | Type of polymer particle | | — | W4005 | W4005 |
| | Thickness (μm) of conductive layer | | — | * | 10 |
| Battery characteristics | Discharge capacity | | B | * | C |
| | Discharge rate | | C | * | D |
| | Cycle life | | C | * | D |
| PTC function | Increase rate of resistance | | D | * | C |

The battery in each of Examples 1 to 10 had battery characteristics comparable with or more excellent than those of the battery in Comparative Example 1 having no conductive layer. As the thickness of the conductive layer was thinner, battery characteristics were enhanced. The battery in each of Examples 1 to 10 was excellent in the increase rate Comparative Example 3 had difficulty in thinning (less than 10 μm) of the conductive layer because the conductive particle was not sufficiently dispersed.

The entire content disclosed in Japanese Patent Application No. 2014-247699 filed on Dec. 8, 2014 is herein incorporated by reference.

All the literatures, patent applications, and technical standards described herein are herein incorporated by reference as if it is specifically and individually stated that the individual literatures, patent applications, and technical standards are incorporated by reference.

The invention claimed is:

1. A positive electrode for a lithium ion secondary battery, the positive electrode comprising:
    a positive electrode current collector;
    a conductive layer which is disposed directly or indirectly on the positive electrode current collector, and which comprises a conductive particle, a polymer particle, and a resin comprising a structural unit derived from a nitrile group-containing monomer; and
    a positive electrode active material layer disposed directly or indirectly on the conductive layer,
    wherein the resin comprising a structural unit derived from a nitrile group-containing monomer comprises at least one selected from the group consisting of a structural unit derived from a monomer represented by the following Formula (I) and a structural unit derived from a monomer represented by the following Formula (II):

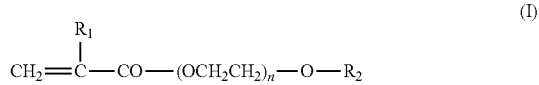

(I)

wherein, $R_1$ represents H or $CH_3$, $R_2$ represents H or a monovalent hydrocarbon group, and n represents an integer from 1 to 50; and

(II)

wherein, $R_3$ represents H or $CH_3$, and $R_4$ represents an alkyl group having from 4 to 100 carbon atoms.

2. The positive electrode for a lithium ion secondary battery according to claim 1, wherein a mass ratio of a total of the conductive particle and the polymer particle with respect to the resin comprising a structural unit derived from a nitrile group-containing monomer (total of the conductive particle and the polymer particle: the resin) included in the conductive layer is from 99.9:0.1 to 95:5.

3. The positive electrode for a lithium ion secondary battery according to claim 2, wherein a thickness of the conductive layer is from 1 μm to 10 μm.

4. The positive electrode for a lithium ion secondary battery according to claim 2, wherein an average particle size of the polymer particle is from 0.05 μm to 5 μm.

5. The positive electrode for a lithium ion secondary battery according to claim 2, wherein the conductive particle is a carbon particle.

6. The positive electrode for a lithium ion secondary battery according to claim 2, wherein an average particle size of a primary particle of the carbon particle is from 10 nm to 500 nm.

7. The positive electrode for a lithium ion secondary battery according to claim 2, wherein the polymer particle is a polyolefin particle.

8. The positive electrode for a lithium ion secondary battery according to claim 2, wherein a mass ratio of the conductive particle with respect to the polymer particle (conductive particle: polymer particle) is from 2:98 to 20:80.

9. The positive electrode for a lithium ion secondary battery according to claim 2, wherein the positive electrode active material layer comprises a lithium-containing composite metal oxide as a positive electrode active material.

10. The positive electrode for a lithium ion secondary battery according to claim 2, wherein a packing density of the positive electrode active material layer is from 2.2 g/cm³ to 2.8 g/cm³.

11. A lithium ion secondary battery, comprising the positive electrode for a lithium ion secondary battery according to claim 2.

12. The positive electrode for a lithium ion secondary battery according to claim 2, wherein the conductive layer is an aggregate of a mixture comprising conductive particles, polymer particles, and the resin comprising a structural unit derived from a nitrile group-containing monomer.

13. The positive electrode for a lithium ion secondary battery according to claim 12, wherein an average particle size of the polymer particles is from 0.05 μm to 5 μm.

14. The positive electrode for a lithium ion secondary battery according to claim 12, wherein an average particle size of the polymer particles is from 0.2 μm to 2 μm.

15. The positive electrode for a lithium ion secondary battery according to claim 12, wherein a mass ratio of the conductive particles with respect to the polymer particles (conductive particles: polymer particles) is from 2:98 to 20:80.

* * * * *